Aug. 21, 1951     J. M. MOCHEL     2,564,706
COATED RESISTANCE
Filed May 2, 1946     3 Sheets-Sheet 1
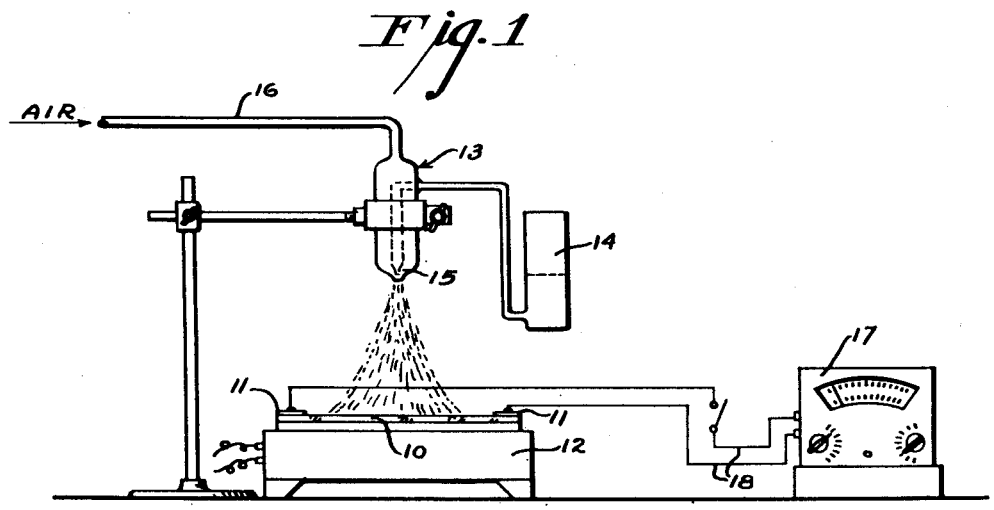
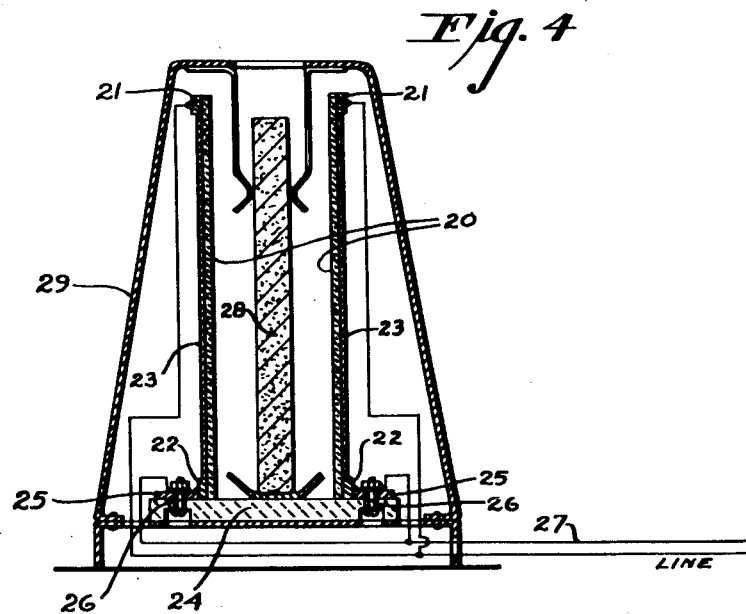
Inventor
JOHN M. MOCHEL
By Knight & Fowler
Attorneys

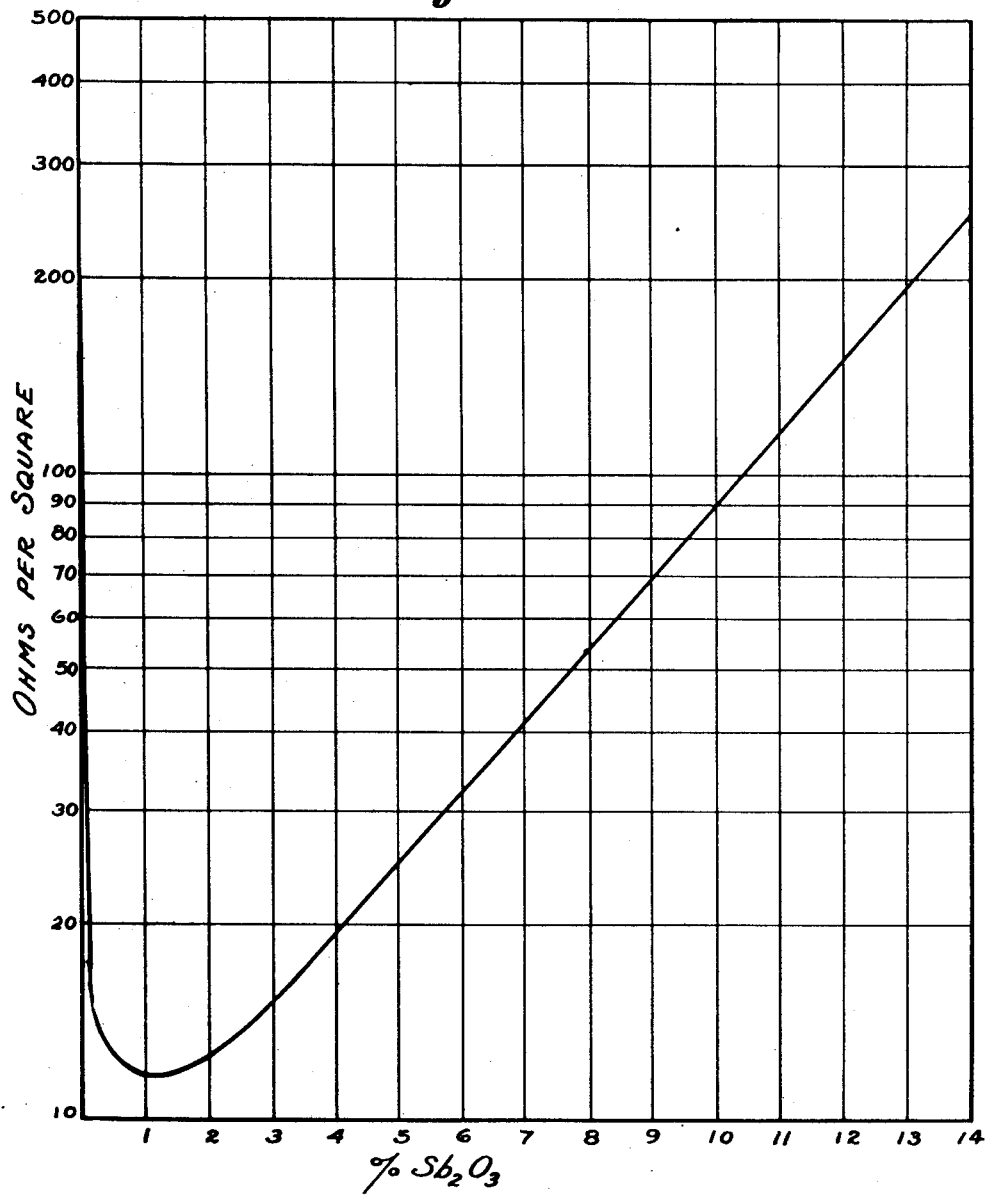

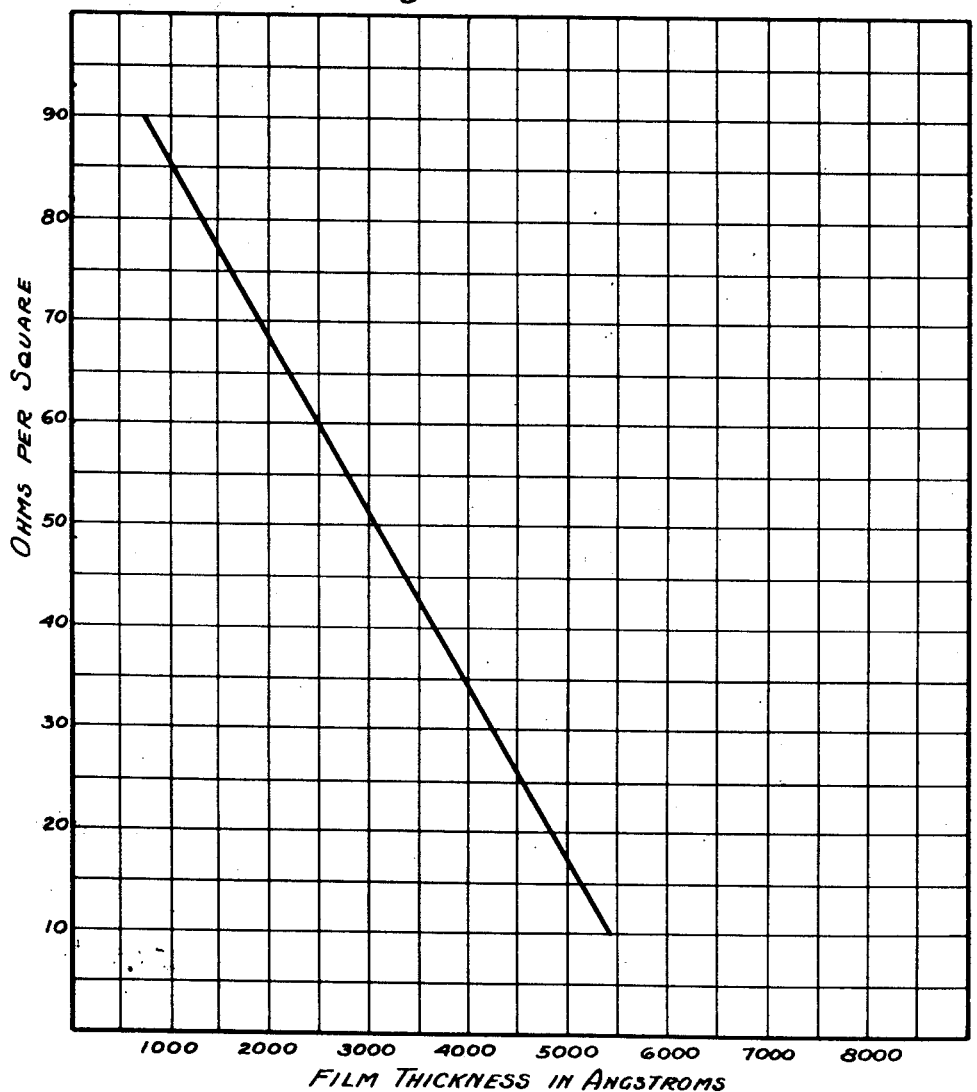

Patented Aug. 21, 1951

2,564,706

UNITED STATES PATENT OFFICE 2,564,706

COATED RESISTANCE

John M. Mochel, Corning, N. Y., assignor to Corning Glass Works, Corning, N. Y., a corporation of New York Application May 2, 1946, Serial No. 666,555

6 Claims. (Cl. 219—19)

This invention relates to glass articles and other ceramic bodies having electrically conducting oxide coatings of the kind known generally as iridized coatings. When glass or other vitreous ceramic body is heated and contacted with certain metal salts either in the form of fumes or atomized solutions thereof, a strongly adherent iridescent layer of oxide is formed on its surface. This process is known as idirizing because the coatings thus produced are iridescent due to interference of light waves reflected from the extremely thin oxide films.

The application of iridizing to glass for the production of beautiful art ware is quite old and for this purpose salts of tin and of iron are employed. More recently it has been found that tin iridized coatings have a sufficiently low electrical resistivity to permit their use for certain electrical purposes, for example, as coatings on high tension electric insulators for the purpose of spreading the potential gradient on the surface of the insulator and thus preventing corona and radio interference. For this purpose, tin iridized coatings are particularly suitable because their electrical resistivities are so high that they conduct only very small currents and do not cause any appreciable power loss, as described in Patent No. 2,118,795 issued May 2, 1938, to Jesse T. Littleton. The patent shows that iridized coatings produced by salts of other metals including iron, titanium, tantalum, columbium, aluminum, antimony, zirconium, thorium, thallium and chromium have such extremely high electrical resistivities as to be practically non-conducting.

One of the chief objects of this invention is to produce glass and other non-porous ceramic articles having electrically conducting coatings which are permanently incorporated with the glass or ceramic surface, which have high chemical and thermal stability and which have sufficiently low electrical resistivities to permit the use of such articles for electric heating devices.

Another object is to lower the electrical resistivity of tin iridized coatings.

Another object is to produce conducted iridized coatings which have zero or positive temperature coefficients of resistance.

Another object is to control the electrical resistivity of tin iridized coatings.

Another object is to provide transparent electric resistance elements of glass for use in electric heating devices such as ovens, broilers, toasters, flat irons, grills, space heaters and the like.

Another object is to provide glass bodies having iridized coatings of predetermined electrical resistance.

Another object is to provide transparent electrically conducting iridized coatings which contain both tin and antimony.

To these and other ends the invention comprises ceramic articles provided with electrically conducting iridized coatings containing oxides of tin and antimony, to be hereinafter more fully described and illustrated in the accompanying drawings in which:

Fig. 1 is an elevation of an apparatus for iridizing glass sheets in accordance with the invention;

Fig. 2 is a graph illustrating the change in electrical resistance of tin-antimony iridized coatings with variation of the antimony content;

Fig. 3 is a graph illustrating the change in electrical resistance of tin-antimony iridized films with variation in thickness.

Fig. 4 is a vertical sectional view of an electrically heated device for toasting bread made in accordance with the invention.

I have discovered that the electrical resistivity of tin iridized coatings may be decreased by the introduction of antimony. Iridized films may be produced by a mixture of salts of tin and antimony which have electrical resistivities only about one-twentieth of the resistivities of similar films produced by a salt or salts of tin alone.

The conducting films or coatings of the present invention are composed of mixtures of oxides containing an oxide of tin and from .001% to about 15% by weight of an oxide of antimony. Their electrical resistivities are influenced by various factors including the presence therein of minor amounts of modifying metallic oxides, the temperature at which the films are produced and the relative expansion coefficients of the films and the glass or ceramic body upon which they are deposited, as will hereinafter be more fully explained.

(The resistance of a conductor is proportional to the length and inversely proportional to the cross sectional area of the conductor. For a given thickness, the resistance of a film then becomes proportional to the length and inversely proportional to the width of the film and, if the length also equals the width, the resistance remains constant regardless of the size of the film. The term "ohms per square" is therefore employed as the unit of resistance of the electrically conducting films described herein.)

The electrically conducting films of this invention may be formed advantageously upon the surface of a glass article, such as a glass sheet. They are preferably produced by heating the glass uniformly as hot as possible without deforming it or to about 500° C. or above and atomizing a solution containing the desired metal salts as a fine mist upon the heated glass for a length of time sufficient to produce an iridized film of the desired thickness and electrical resistivity. Although liquid antimony pentachloride SbCl5 may be dissolved directly in liquid anhydrous stannic tetrachloride (SnCl4) and the mixture may be vaporized by a stream of air passed through it, it is preferable to atomize a water solution of tin and antimony chlorides containing free hydrochloric acid because better control of film thickness can thereby be obtained and other metal salts can thereby be introduced into the solution as modifying agents, as will be shown. For convenience the proportions of the base solution may comprise 100 grams of stannic tetrachloride pentahydrate $$(SnCl_4 \cdot 5H_2O)$$

50 cc. of water and 10 cc. of concentrated aqueous hydrochloric acid, to which may be added the desired amount of antimony trichloride and, if desired, other metal salts. The atomized solution is preferably directed perpendicularly against the surface to be coated for a time, usually 10 to 20 seconds, which will depend upon various factors including the rate of atomization, concentration of the solution and the desired thickness of the film. The thickness depends upon the desired electrical resistance of the film. For thicknesses up to about 5500 Angstroms, the electrical resistance of a film consisting of oxides of tin and antimony decreases linearly as the thickness increases. The electrical resistance may be measured with an ohmmeter during iridizing. For this purpose and for subsequent use in the application of electric current to the film, permanent electrical contacts therewith are provided on the glass plate before iridizing takes place. This is best accomplished by metallizing two opposite edges of the glass plate, preferably by the application thereto of a platinizing solution which is fired on in the usual manner to provide adherent bands or stripes of metallic platinum on the glass.

In the drawings, Fig. 1 illustrates generally the preferred method of iridizing. A glass plate 10, provided with platinized stripes 11 (shown on an exaggerated scale) on two opposite edges, is about three inches square between the stripes 11. It is heated uniformly on an electric hot plate 12. An atomizer, generally designated 13 and preferably composed of glass, comprises a cup 14 for containing the solution of tin and antimony salts to be atomized, an atomizing nozzle 15 and a tube 16 for the introduction of compressed air to the nozzle. The atomizer is so supported that the nozzle 15 is about one foot above the glass plate. An ohmmeter 17 is provided with two contact leads 18 which may be brought into electrical contact with the stripes 11 (as shown) before atomization. As atomization proceeds and a conducting iridized film is formed on the glass, the electrical resistance which is registered by the ohmmeter decreases from an initial infinite value as the thickness of the film increases. When the electrical resistance attains a sufficiently low value, atomization is stopped by cutting off the supply of compressed air to the atomizer 13.

To some extent the electrical resistivity of the iridized film is affected by the temperature at which it is formed and lower resistivities result from higher temperatures. Therefore it is preferable to heat the glass as hot as possible without deforming it. For example, a heat resisting borosilicate glass having a softening temperature of about 800° C. is preferably held at about 700° C. during iridization.

The thickness of the iridized film may be gauged by the apparent color of the film caused by interference of light reflected therefrom. As the thickness of the film increases its apparent color changes and the order or succession of the colors with increasing thickness is analogous to that of the well known Newton rings described in "A Treatise on Light," by R. A. Houstoun, Longmans Green & Co., Ltd., (1938), page 147, as follows:

1st order—white, yellow, red,
2nd order—violet, blue, green, yellow, red,
3rd order—purple, blue, green, yellow, red,
4th order—green, red,
5th order—greenish-blue, red,
6th order—greenish-blue, pale red,
7th order—greenish-blue, reddish-white.

Obviously, a film of uniform thickness will appear to be of one color only. A slight non-uniformity in film thickness at the edge of the plate will produce sufficient color sequence to identify the order of thickness of the main portion of the film. As a further aid, a long strip of glass may be iridized by directing the spray at one end thereof whereby the various orders of colors will be spread longitudinally of the strip and will serve as a convenient comparison. Since red marks the end of each order, this color is preferably employed as the distinguishing mark of the successive orders. For present purposes, red light has a wave length of 6200 Angstroms. Calculation shows that the approximate film thickness in Angstroms for the various orders of red is as follows:

| Order | Angstroms |
|-------|-----------|
| 1 | 775 |
| 2 | 2,320 |
| 3 | 3,870 |
| 4 | 5,420 |
| 5 | 6,970 |

The effect of antimony upon the electrical resistivity of tin iridized films is demonstrated in the graph shown in Fig. 2 wherein the resistance of 4th order iridized films consisting of oxides of tin and antimony on borosilicate glass is plotted against the weight percentage of antimony oxide ($Sb_2O_3$) calculated from the compositions of the solutions employed to produce the iridized films. Since the change in resistance is very great as compared to the change in antimony content, the resistance is plotted on a logarithmic scale in order to reduce the size of the graph and to permit a better presentation of the data. It will be noted that the resistance decreases very rapidly with very small additions of antimony oxide (.001% to .5% $Sb_2O_3$) and a minimum resistance of about 12 ohms per square for the 4th order is obtained with about 1% $Sb_2O_3$. The resistance is about 200 ohms per square when the antimony content is approximately 13% $Sb_2O_3$. For the production of resistance elements for electric heating devices, the antimony content of the film is preferably equivalent to about 1% to 10% $Sb_2O_3$.

The electrical resistance of tin-antimony iridized films of constant composition decreases regularly with increasing film thickness up to the 4th or 5th order. The decrease in electrical resistance with increase in film thickness is illustrated by the graph shown in Fig. 3 in which the electrical resistance in ohms per square of an iridized film composed of about 98.5% $SnO_2$ and 1.5% $Sb_2O_3$ is plotted against the thickness of the film in Angstroms for films of the 1st to the 4th orders inclusive. For thicknesses beyond the 5th order, the crystal structure of the film tends to degenerate and the decrease in electrical resistance with increase in thickness becomes less marked. Increase of antimony content in the film diminishes the tendency for degeneration of its crystal structure and films of high orders of thickness up to the 20th order (60,000 Angstroms) or thicker can be made. A tin-antimony film of the 13th order of thickness containing about 1% $Sb_2O_3$ was made which had an electrical resistance of 4 ohms per square.

The conducting iridized films made in accordance with this invention possess a characteristic which not only has great importance for their use in electric heating devices, but is in direct contradiction with the known characteristics of electric conductors in general. Most of the new low resistance films have positive temperature coefficients of resistance, that is, their resistances increase slightly with rise in temperature. It is well known that metallic conductors have positive temperature coefficients of resistance but that metal oxides in general have negative temperature coefficients of resistance. It is therefore surprising that the temperature coefficients of resistance of the new low resistance films should have a positive value, inasmuch as they are composed of metal oxides insofar as is known. It is the more surprising in that iridized films produced with a salt of tin alone usually have negative coefficients of resistance.

Under some circumstances, the temperature coefficient of resistance of the new iridized films may be negative. This may occur in films consisting of oxides of tin and antimony when the antimony content is high. It may also occur when other metal oxides are added as modifiers, as will be shown. Such negative temperature coefficients of resistance are so small, however, that the films are useful for the purpose of this invention.

It has also been found that, when the thermal expansion coefficient of the iridized film, which is about $45 \times 10^{-7}$ cm. per cm. per degree C., too greatly exceeds the thermal expansion coefficient of the glass or ceramic support upon which the film is deposited, the temperature coefficient of resistance of the film may be negative if the antimony content is low and the film is relatively thick. For example, on a high silica glass having a thermal expansion coefficient of about $8 \times 10^{-7}$ cm. per cm. per degree C. a tin-antimony iridized film of the 4th order containing about 1% $Sb_2O_3$ has a negative temperature coefficient of resistance. The latter value will be positive if the film is thin, say of the 1st order, or if the antimony content is somewhat higher, say about 5% $Sb_2O_3$. The temperature coefficients of resistance of low resistance tin-antimony films deposited on heat resisting borosilicate glass having a thermal expansion coefficient of about $33 \times 10^{-7}$ cm. per cm. per degree C. are usually positive and such articles are particularly useful for electric heating devices. It is believed that negative temperature coefficients of resistance due to differences in expansion coefficients result from stresses in the iridized film caused by differential expansion between the film and its support when the temperature is increased. Antimony contents of about 1% to 2% or more of $Sb_2O_3$ appear to toughen the film or otherwise diminish the effect of the differential expansivities.

A positive or zero temperature coefficient of resistance is important for coatings which are to be used for the generation of heat because local overheating and destructive flashover of the coating are thereby avoided. Heretofore, only metallized coatings or thin layers of metal on glass or ceramics were suitable for this purpose. Such metallized coatings have maximum electrical resistances of only about 10 ohms per square and higher resistances are desirable. The new iridized coatings may be produced with predetermined electrical resistances ranging from about 10 ohms per square or less to about 200 ohms per square.

Another important characteristic of the electrically conducting iridized films made in accordance with this invention is their substantial transparency for visible light. With low antimony contents, 1% $Sb_2O_3$ or less, such films are substantially transparent and are practically colorless by transmitted light. However, as the antimony content is increased the film acquires a blue color which becomes darker with increasing antimony and with about 15% $Sb_2O_3$ the film transmits a deep midnight blue color and has a generally low visibile transmission.

For the production of transparent heating elements, such as devices for toasting bread, which are to be operated at temperatures of about 350° C., or higher, on a line voltage of 110 volts, an electrical resistance of about 40 ohms per square is required and it will be evident from the foregoing discussion that iridized films consisting of oxides of tin and antimony may be objectionably colored for this purpose since they must contain about 7% $Sb_2O_3$. For such purposes I have found that the electrical resistance of the iridized films may advantageously be controlled by the addition to the iridizing solution of other metal salts which will raise the resistivity of the films to the desired extent without decreasing their transmission for visible light. Any metal the salt of which will hydrolyze in water alone to precipitate the corresponding metal oxide may be used without causing substantial coloration of the iridized film. Such modifying salts vary somewhat in their effectiveness and for small antimony contents (1% or less $Sb_2O_3$) may cause very rapid increase in the electrical resistivity of tin-antimony iridized films for relatively small increments of the salt. As the antimony content of the iridized film is increased, the effect of the modifying salt is diminished so that larger amounts, up to about 20%, of the modifying salt can be tolerated and the control of electrical resistance thereby becomes more flexible. Salts of vanadium, iron, copper and zinc even in small amounts cause a particularly rapid rise in the electrical resistivity of the iridized film. Films containing ZnO make good electrical contact with platinum metallizing and show little or no contact resistance, which makes them desirable from a commercial standpoint. Salts of manganese, cobalt and nickel are less effective and are preferable on that account because they provide more accurate control of the electrical resistance of the iridized film.

Manganese chloride is particularly desirable for this purpose because it not only causes a more gradual increase in the electrical resistivity of the iridized film but it also unexpectedly causes a marked decrease in the color which is due to large antimony contents, although by itself it imparts no substantial coloration to the film. For example, a 4th order tin-antimony film containing about 3% $Sb_2O_3$ and having an electrical resistance of about 15 ohms per square has a decided blue color by transmitted light. A similar film containing in addition about 10% $MnO_2$ has an electrical resistance of about 23 ohms per square and is substantially colorless and transparent.

In the following examples, which illustrate the invention, the respective solutions were atomized for 15 seconds on plates of heat resistant borosilicate glass heated at about 700° C., unless otherwise specified. The electrical resistance of the resulting iridized film was measured and other characteristics were noted as set forth in the examples.

Example 1

The solution consisted of 100 g. $SnCl_4 \cdot 5H_2O$, .0625 g. $SbCl_3$, 50 cc. $H_2O$ and 10 cc. HCl, equivalent to 99.91% $SnO_2$ and .09% $Sb_2O_3$. The fifth order film was colorless by transmitted light and had an electrical resistance of 24 ohms per square and a positive temperature coefficient of resistance.

Example 2

The solution consisted of 100 g. $SnCl_4 \cdot 5H_2O$, .5 g. $SbCl_3$, 50 cc. $H_2O$ and 10 cc. HCl, equivalent to 99.26% $SnO_2$ and .74% $Sb_2O_3$. The fourth order film was colorless and had an electrical resistance of 12 ohms per square and a positive temperature coefficient of resistance.

Example 3

The solution consisted of 100 g. $SnCl_4 \cdot 5H_2O$, 4 g. $SbCl_3$, 50 cc. $H_2O$ and 10 cc. HCl, equivalent to 94.5% $SnO_2$ and 5.5% $Sb_2O_3$. The fourth order film was blue and had an electrical resistance of 21 ohms per square and a positive temperature coefficient of resistance.

Example 4

The solution consisted of 100 g. $SnCl_4 \cdot 5H_2O$, 8 g. $SbCl_3$, 50 cc. $H_2O$ and 10 cc. HCl, equivalent to 89.4% $SnO_2$ and 10.6% $Sb_2O_3$. The third order film was dark blue and had an electrical resistance of 130 ohms per square.

Example 5

The solution consisted of 100 g. $SnCl_4 \cdot 5H_2O$, 1 g. $SbCl_3$, 8 g. $MnCl_2 \cdot 4H_2O$, 50 cc. $H_2O$ and 10 cc. HCl, equivalent to 91.3% $SnO_2$, 1.3% $Sb_2O_3$ and 7.4% $MnO_2$. Atomization time was 12 sec. The 4th order film was colorless and had an electrical resistance of 32 ohms per square and a positive temperature coefficient of resistance.

Example 6

The solution consisted of 100 g. $SnCl_4 \cdot 5H_2O$, 4 g. $SbCl_3$, 16 g. $MnCl_4 \cdot 4H_2O$, 50 cc. $H_2O$ and 10 cc. HCl, equivalent to 81.8% $SnO_2$, 4.9% $Sb_2O_3$ and 13.3% $MnO_2$. The 3rd order film was substantially colorless and had an electrical resistance of 36 ohms per square and a positive temperature coefficient of resistance.

Example 7

The solution consisted of 100 g. $SnCl_4 \cdot 5H_2O$, 1.5 g. $SbCl_3$, 1 g. $V_2O_5$, 50 cc. $H_2O$ and 10 cc. HCl, equivalent to 95.7% $SnO_2$, 2.1% $Sb_2O_3$ and 2.2% $V_2O_5$. The 4th order film was colorless and had an electrical resistance of 42 ohms per square.

Example 8

The solution consisted of 100 g. $SnCl_4 \cdot 5H_2O$, .5 g. $SbCl_3$, .5 g. $BiCl_3$, 50 cc. $H_2O$ and 10 cc. HCl, equivalent to 98.4% $SnO_2$, .7% $Sb_2O_3$ and .9% $Bi_2O_3$. The 4th order film had a faint brown tint and an electrical resistance of 50 ohms per square and a negative temperature coefficient of resistance which became positive at about 250° C.

Example 9

The solution consisted of 100 g. $SnCl_4 \cdot 5H_2O$, 4 g. $SbCl_3$, 4 g. $BiCl_3$, 50 cc. $H_2O$ and 10 cc. HCl, equivalent to 88.6% $SnO_2$, 5.3% $Sb_2O_3$ and 6.1% $Bi_2O_3$. The 4th order film had a slight brown tint and an electrical resistance of 36 ohms per square and a negative temperature coefficient of resistance which changed to positive at about 150° C.

Example 10

The solution consisted of 100 g. $SnCl_4 \cdot 5H_2O$, 4 g. $SbCl_3$, 6 g. $BiCl_3$, 50 cc. $H_2O$ and 10 cc. HCl, equivalent to 86% $SnO_2$, 5.1% $Sb_2O_3$ and 8.9% $Bi_2O_3$. The 4th order film had a brownish tint and an electrical resistance of 75 ohms per square.

Example 11

The solution consisted of 100 g. $SnCl_4 \cdot 5H_2O$, 2 g. $SbCl_3$, 8 g. $CoCl_2 \cdot 6H_2O$, 50 cc. $H_2O$ and 10 cc. HCl, equivalent to 91.4% $SnO_2$, 2.7% $Sb_2O_3$ and 5.9% $Co_2O_3$. The 4th order film was colorless and had an electrical resistance of 32 ohms per square and a positive temperature coefficient of resistance.

Example 12

The solution consisted of 100 g. $SnCl_4 \cdot 5H_2O$, 4 g. $SbCl_3$, 1 g. $ZnCl_2$, 50 cc. $H_2O$ and 10 cc. HCl, equivalent to 93.2% $SnO_2$, 5.5% $Sb_2O_3$ and 1.3% ZnO. The 4th order film was blue by transmitted light and had an electrical resistance of 31 ohms per square and a positive temperature coefficient of resistance.

A 4th order film of the same composition was applied to a 2 inch square plate of high silica glass having a thermal expansion coefficient of about $8 \times 10^{-7}$ cm. per cm. per degree C. The film had an electrical resistance of 42 ohms per square. When an alternating current equivalent to 300 watts at 110 volts was passed through the film for a few minutes its temperature, as measured by an optical pyrometer, rose to 825° C. and its electrical resistance increased to 56 ohms per square. On cutting off the current and cooling to room temperature, its resistance reverted to about 42 ohms per square. Seven cycles of heating by passage of current followed by cooling to room temperature caused no substantial change in the respective resistances and other properties.

Example 13

The solution consisted of 100 g. $SnCl_4 \cdot 5H_2O$, 1 g. $SbCl_3$, 1 g. $FeCl_3 \cdot 6H_2O$, 50 cc. $H_2O$ and 10 cc. HCl, equivalent to 98% $SnO_2$, 1.4% $Sb_2O_3$ and .6% $Fe_2O_3$. The 5th order film was colorless and had an electrical resistance of 28 ohms per square and a zero temperature coefficient of resistance.

Example 14

The solution consisted of 100 g. $SnCl_4 \cdot 5H_2O$, 2 g. $SbCl_3$, 4 g. $CoCl_2 \cdot 6H_2O$, 50 cc. $H_2O$ and 10 cc. HCl, equivalent to 94.1% $SnO_2$, 2.8% $Sb_2O_3$ and 3.1% $Co_2O_3$. The 4th order film was colorless and had an electrical resistance of 24 ohms per square and a positive temperature coefficient of resistance.

Example 15

The solution consisted of 100 g. $SnCl_4 \cdot 5H_2O$, 1 g. $SbCl_3$, 8 g. $NiCl_2 \cdot 6H_2O$, 50 cc. $H_2O$ and 10 cc. HCl, equivalent to 92.5% $SnO_2$, 1.4% $Sb_2O_3$ and 6% $Ni_2O_3$. The 4th order film was colorless and had an electrical resistance of 45 ohms per square.

Example 16

The solution consisted of 100 g. $SnCl_4 \cdot 5H_2O$, 1 g. $SbCl_3$, 1 g. $ThCl_4$, 50 cc. $H_2O$ and 10 cc. HCl, equivalent to 97% $SnO_2$, 1.4% $Sb_2O_3$ and 1.6% $ThO_2$. The 3rd order film was colorless and had an electrical resistance of 18 ohms per square and a positive temperature coefficient of resistance.

Example 17

The solution consisted of 100 g. $SnCl_4 \cdot 5H_2O$, 1 g. $SbCl_3$, .5 g. $CuCl_2$, 50 cc. $H_2O$ and 10 cc. HCl, equivalent to 97.9% $SnO_2$, 1.4% $Sb_2O_3$ and .7% CuO. The 4th order film was colorless and had an electrical resistance of 25 ohms per square and a positive temperature coefficient of resistance.

Example 18

The solution consisted of 100 g. $SnCl_4 \cdot 5H_2O$, 1 g. $SbCl_3$, 4 g. $CrCl_3$, 50 cc. $H_2O$ and 10 cc. HCl, equivalent to 94.4% $SnO_2$, 1.4% $Sb_2O_3$ and 4.2% $Cr_2O_3$. The 4th order film was colorless and had an electrical resistance of 18 ohms per square and a positive temperature coefficient of resistance.

Conducting iridized films made in accordance with this invention have good chemical stability and their electrical properties undergo little, if any, change under adverse conditions. This is demonstrated in the following examples.

Example 19

A sheet of borosilicate glass having a thermal expansion coefficient of $33 \times 10^{-7}$ cm. per cm. per degree C. was provided with platinized stripes along two opposite edges so that the surface area between the stripes was 3 inches square. The plate was then iridized with the solution shown in Example 12 until an iridized film of about the 3rd order was formed on and between the platinized stripes. The initial electrical resistance of the iridized film was 39 ohms per square. The film was heated for 100 hours at a temperature of 350° C. by passing through it an alternating electric current equivalent to 10.8 watts per square inch at an applied voltage which was varied between 61 and 63 volts in order to maintain constant wattage. At the end of this time the resistance was 38 ohms per square.

Example 20

An iridized glass plate similar in all respects to that described in Example 19 was tempered in known manner, after iridizing, by heating it to a temperature between its strain and annealing points and thereafter quenching it with a stream of cold air. The plate was then heated for 494 hours at a temperature of 400° C. by passing thru the film an alternating electric current equivalent to 14.2 watts per square inch at an applied voltage of 63 to 66 volts. The initial electrical resistance of the film at 400° C. was 34.2 ohms per square. After 110 hours the resistance was 31.4 ohms per square and at the end of 494 hours the resistance was 32.6 ohms per square. The slight decrease in resistance was caused by the stabilization of stresses induced in the film by tempering. Once stabilized, the resistance remains substantially constant.

Example 21

A tempered iridized glass plate similar in all respects to that described in Example 20 was heated at 350° C. by passing through the film an alternating electric current equivalent to 10.8 watts per square inch. After the electrical resistance had become stabilized at 36.7 ohms per square the film was heated for 2 hours at 350° C., then cooled and exposed for 30 minutes to live steam after which it was again heated for 2 hours at 350° C. as before. Alternate heating and steaming were continued for 21 cycles after which the resistance was found to be 38 ohms per square.

Example 22

A tempered iridized glass plate similar in all respects to that described in Example 20 was heated at 350° C. by passing through the film an alternating electric current equivalent to 10.8 watts per square inch. After the electrical resistance had become stabilized at 33.9 ohms per square the plate was cooled to room temperature and the iridized film was smeared with the cooking fat known on the market as "Crisco." The film was then heated as before for about 30 minutes during which time the "Crisco" was burned off leaving a slight carbonaceous residue. The plate was again cooled and the film was again smeared with "Crisco" after which it was again heated for about 30 minutes to burn off the "Crisco." After 42 cycles of alternate greasing and burning off the resistance measured 33.9 ohms per square.

Example 23

A tempered iridized glass plate similar in all respects to that described in Example 20 was treated by alternately greasing it and burning off the grease as in Example 22 with the exception that after each burning off the carbonaceous residue was removed from the iridized film by scouring with the cleanser known as "Bon Ami" before the film was regreased. The temperature of heating was 350° C. The stabilized initial resistance at 350° C. was 32.2 ohms per square. After 47 cycles of alternate greasing, burning off and scouring the resistance measured 32.2 ohms per square.

From the foregoing examples it will be seen that iridized glass or ceramic bodies having the low resistance films of this invention are particularly suitable for use as the heating elements or units of electric heating devices, such as hot plates or electric range units for culinary purposes, grills, toasters, flatirons, space heaters, electrically heated window panes, vehicle windows, windshields, wall panels, and the like. It is a peculiar characteristic of the new low resistance iridized films that when deposited on transparent glass sheets and heated by the passage of electric current, they emit more radiant heat from the back, that is, through the glass, than from the outer face of the film. This fact in some cases enhances their utility, particularly in cases where it might be desirable to bring the heating unit into contact with food to be cooked as in devices for making griddle cakes, waffles, etc.

The new low resistance iridized films may also be used for purposes other than for electric heating devices, as for example, to form the conducting laminations in capacitors.

To illustrate electric heating devices made in accordance with this invention reference is had to Fig. 4 in which two glass plates 20 are provided on opposite edges with platinized stripes 21 and 22 (shown on an exaggerated scale), and tin-antimony iridized films 23 (also greatly exaggerated) therebetween. The plates 20 are supported in spaced parallel relation on a dielectric base 24 by metal strips 25 which are attached to the lower platinized stripes 22. The metal strips 25 are secured to the base 24 by binding posts 26 to which a wire 27 forming one side of an electric circuit is connected. The other side of the circuit is electrically connected with the top platinized stripes 21. From this it will be seen that the iridized films 23 are electrically connected in parallel. Between the glass plates 20 is located a slice of bread 28 to be toasted and the entire assembly is surrounded by a metal protecting shell 29.

Other arrangements of the various parts of the device shown in Fig. 4 and modifications thereof for other purposes will be apparent to those skilled in the art and are included within the scope of the invention as claimed.

I claim:

1. An electric resistance device which comprises a non-porous ceramic body having an electrically conducting iridized coating comprising primarily an oxide of tin and an oxide of antimony equivalent to about .001% to less than 13% $Sb_2O_3$ and provided with spaced metallic members in electrical contact with said coating.

2. An electric resistance device which comprises a non-porous ceramic body having an electrically conducting iridized coating comprising primarily an oxide of tin and an oxide of antimony equivalent to about 1% to 10% $Sb_2O_3$, and provided with spaced metallic members in electrical contact with said coating.

3. An electric resistance device which comprises a non-porous ceramic body having an electrically conducting iridized coating consisting of an oxide of tin, an oxide of antimony equivalent to 1% to 10% $Sb_2O_3$ and not over 20% of an oxide of a metal selected from the group consisting of Cu, Zn, Th, V, Bi, Cr, Mn, Fe, Co, and Ni, and provided with spaced metallic members in electrical contact with said coating.

4. An electric resistance device which comprises a non-porous ceramic body having an electrically conducting iridized coating consisting of metal oxides equivalent to about 93% $SnO_2$, 5.5% $Sb_2O_3$, and 1.5% ZnO, and provided with spaced metallic members in electrical contact with said coating.

5. An electric resistance device which comprises a non-porous ceramic body having an electrically conducting iridized coating consisting of an oxide of tin, an oxide of antimony equivalent to 1% to 10% $Sb_2O_3$, and not over 20% ZnO, and provided with spaced metallic members in electrical contact with said coating.

6. An electrical device having a resistive coating, which comprises a nonporous ceramic body having an electrically conducting iridized coating comprising primarily an oxide of tin and an oxide of antimony equivalent to about .001% to less than 13% $Sb_2O_3$ and provided with a metallic terminal in electrical contact with said coating.

JOHN M. MOCHEL.

REFERENCES CITED

The following references are of record in the file of this patent:

UNITED STATES PATENTS

| Number | Name | Date |
|---|---|---|
| 1,954,832 | Ruben | Apr. 17, 1934 |
| 2,118,795 | Littleton | May 24, 1938 |
| 2,119,680 | Long | June 7, 1938 |
| 2,165,970 | Jaspers | July 11, 1939 |
| 2,194,189 | Wheeler et al. | Mar. 19, 1940 |
| 2,274,955 | Dykstra et al. | Mar. 3, 1942 |
| 2,293,822 | Haven | Aug. 25, 1942 |
| 2,429,420 | McMaster | Oct. 21, 1947 |